United States Patent
Schumann et al.

(10) Patent No.: US 10,232,723 B2
(45) Date of Patent: Mar. 19, 2019

(54) DEVICE FOR TRANSFERRING ENERGY BY INDUCTION COMPRISING A MONITORING DEVICE

(71) Applicant: Robert Bosch GmbH, Stuttgart (DE)

(72) Inventors: Philipp Schumann, Stuttgart (DE); Achim Henkel, Stuttgart (DE); Bernhard Mader, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/526,815

(22) PCT Filed: Sep. 21, 2015

(86) PCT No.: PCT/EP2015/071599
§ 371 (c)(1),
(2) Date: May 15, 2017

(87) PCT Pub. No.: WO2016/078801
PCT Pub. Date: May 26, 2016

(65) Prior Publication Data
US 2017/0313204 A1 Nov. 2, 2017

(30) Foreign Application Priority Data

Nov. 18, 2014 (DE) .................. 10 2014 223 532

(51) Int. Cl.
*B60L 11/18* (2006.01)
*H02J 50/12* (2016.01)
(Continued)

(52) U.S. Cl.
CPC .......... *B60L 11/1829* (2013.01); *B08B 1/002* (2013.01); *B08B 5/02* (2013.01); *B60L 11/182* (2013.01); *B60L 11/1833* (2013.01); *B60L 11/1835* (2013.01); *H02J 7/025* (2013.01); *H02J 50/10* (2016.02); *H02J 50/12* (2016.02); *H02J 50/60* (2016.02); *H02J 50/90* (2016.02);
(Continued)

(58) Field of Classification Search
CPC .................................................... B60L 11/1829
USPC .......................................................... 320/108
See application file for complete search history.

(56) References Cited

U.S. PATENT DOCUMENTS

| 2011/0074346 A1* | 3/2011 | Hall ........................ B60L 3/00 320/108 |
| 2014/0002015 A1* | 1/2014 | Tripathi ................ B60L 11/182 320/108 |

(Continued)

FOREIGN PATENT DOCUMENTS

| EP | 788212 | 8/1997 |
| WO | 2014038707 | 3/2014 |

OTHER PUBLICATIONS

International Search Report for Application No. PCT/EP2015/071599 dated Dec. 4, 2015 (English Translation, 2 pages).

*Primary Examiner* — Suresh Memula
(74) *Attorney, Agent, or Firm* — Michael Best & Friedrich LLP

(57) ABSTRACT

The invention relates to a device for the transferring energy by induction, for a vehicle, between at least one emitter coil and at least one receiver coil of the vehicle, said at least one receiver coil being arranged at a distance from said at least one emitter coil, a field concentrator being arranged between the at least one emitter coil and the at least one receiver coil.

9 Claims, 2 Drawing Sheets

(51) Int. Cl.
  *B08B 1/00* (2006.01)
  *B08B 5/02* (2006.01)
  *H02J 7/02* (2016.01)
  *H02J 50/10* (2016.01)
  *H02J 50/90* (2016.01)
  *H02J 50/60* (2016.01)

(52) U.S. Cl.
  CPC ...... *B60L 2270/147* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

2014/0217966 A1* 8/2014 Schneider ............... H02J 50/12
  320/108
2015/0224882 A1* 8/2015 Brill ...................... B60L 11/182
  320/108

\* cited by examiner

DEVICE FOR TRANSFERRING ENERGY BY INDUCTION COMPRISING A MONITORING DEVICE

BACKGROUND OF THE INVENTION

The present invention relates to a device for inductive energy transfer from at least one emitter coil to at least one receiver coil which is spaced apart from the emitter coil, comprising a device for improving the coupling in the case of an offset between the at least one emitter coil and the at least one receiver coil.

Electric vehicles and hybrid vehicles usually have an electrical energy accumulator, for example, a traction battery, which provides the electrical energy for driving. If this electrical energy accumulator is completely or partially discharged, the electric vehicle must head for a charging station, at which the energy accumulator can be recharged. To this end, it has been commonplace up to now at such a charging station that the electric vehicle is connected to the charging station by means of a cable connection. This connection usually must be manually established by a user. In this case, it is also necessary for the charging station and the electric vehicle to have a mutually corresponding connection system.

Furthermore, wireless charging systems for electric vehicles or hybrid vehicles are also occasionally known. In this case, an electric vehicle is parked over a coil or a charging pad or charging device. This coil emits a magnetic alternating field. The magnetic alternating field is received by a receiver coil within the vehicle and is converted into electrical energy. By means of this electrical energy, a traction battery of the vehicle can then be charged. Document DE 10 2011 010 049 A1 discloses such a system for charging a vehicle battery, in which the energy is transferred by induction.

In addition, the energy accumulator of the electric vehicle can also be used for reclamation. A cable connection or an inductive energy or power transfer can likewise be used for this purpose.

In the wireless charging of a battery of an electric vehicle, there is always a fixed geometry of the emitter coil. Said emitter coil is integrated and optimized for use in a parking space or, in some systems, in the roadway. The space between the coils is usually air. The disadvantage of this configuration is that the magnetic coupling factor between the two coils is very small, and therefore a high reactive power in the power electronics of the transfer must be overcome.

There is a need for a device, therefore, by means of which the coupling factor between the coils of the inductive charging system is improved.

SUMMARY OF THE INVENTION

The device according to the invention has the advantage that the coupling factor between the coils of the inductive charging system is improved.

According to the invention, a device for inductive energy transfer for a vehicle is provided for this purpose, wherein the inductive energy transfer takes place from at least one emitter coil to at least one receiver coil of the vehicle, which is spaced apart from the at least one emitter coil, wherein a field concentrator is disposed between the at least one emitter coil and the at least one receiver coil. Advantageously, due to the field concentrator, the coupling factor between the two coils is improved and is as independent as possible from the relative positioning of the emitter coil and the receiver coil, within a large tolerance range. The offset to be tolerated can be lateral as well as vertical in this case. Due to the field concentrator, relatively large tolerances can be advantageously compensated for during parking, and different ground clearances of different vehicle types or states of charge can be advantageously compensated for.

Due to the measures described in the dependent claims, advantageous refinements of the method described in the independent claim are possible.

The field concentrator is advantageously designed to be mobile. Due to the mobile design, the magnetic field can be better concentrated onto the vehicle coil. The field concentrator in this case is a mobile pedestal which is similar to a mobile robot, by means of which the offset between the vehicle coil and the ground coil can be compensated for in the best possible way. Due to the mobility and the compensation for the offset associated therewith, the coupling factor between the coils is substantially improved.

It is also advantageous that the field concentrator detects a position of the vehicle by means of at least one sensor. The sensor is used in such a way that the field concentrator searches for the optimal position under the vehicle and therefore keeps the variance of the coupling factor as low as possible.

In yet another advantageous embodiment, the at least one sensor is an optical sensor, an inductive sensor, a radar sensor, an ultrasonic sensor, or a sensor which operates by capacitance. All the sensors provide for a precise detection of the vehicle. Alternatively, an internal sensor utilizes the transmission magnetic field for self-orientation.

Advantageously, the field concentrator is positioned between the at least one emitter coil and the at least one receiver coil in such a way that the variance of the coupling factor between the coils is as low as possible. As a result of the improved coupling factor, the intensity of the stray field outside the transmission volume is also reduced.

In yet another advantageous embodiment, the field concentrator is equipped with a lifting unit. The lifting unit makes it possible to adapt to different coil gaps between the at least one emitter coil and the at least one receiver coil.

It is also advantageous to design the field concentrator to be asymmetrical. The asymmetry is utilized for compensating for the parking offset of the vehicle relative to the ground coil/emitter coil by means of suitable rotation and lateral movements. A vehicle which has been parked with slight offset can therefore be effectively charged despite the offset.

Yet another advantageous embodiment of the invention is a field concentrator which comprises a device for sealing and/or a device for cleaning, wherein flexible lips, brushes, or an air blade are preferably used. In the wireless charging of the vehicle, there is an air gap between the emitter coil of the charging station and the receiver coil in the vehicle. Due to the required ground clearance of motor vehicles, this air gap is a few centimeters in size. Air gaps having a size of 10 cm to 25 cm are very widespread in this case. Due to the strong magnetic fields which occur with relatively high magnetic flux densities, it must be ensured that living beings are not endangered by the use of the system, and that foreign objects such as metal objects are not heated or are not heated to too great of an extent. Foreign objects or living beings must therefore be removed from the air gap or prevented from entering the air gap between the two coils. For this purpose, a seal is produced via the flexible lips or the air gap is cleaned by means of brushes or an air blade.

Advantageously, the field concentrator has at least one charging coil, via which the at least one actual battery can be charged. The field concentrator therefore has its own receiver coils, in order to extract energy from the fluctuating field for charging its own battery and, therefore, to be independent of an external, wired current supply.

It is understood that the features which were mentioned above and which will be explained in the following can be used not only in the particular combination indicated, but also in other combinations or alone without departing from the scope of the invention. Further features and advantages of embodiments of the invention result from the following description with reference to the attached drawings.

DETAILED DESCRIPTION

The drawings shown in the figures are not necessarily shown to scale, for reasons of clarity. Identical reference numbers generally designate identical or identically acting components.

Figure 1:
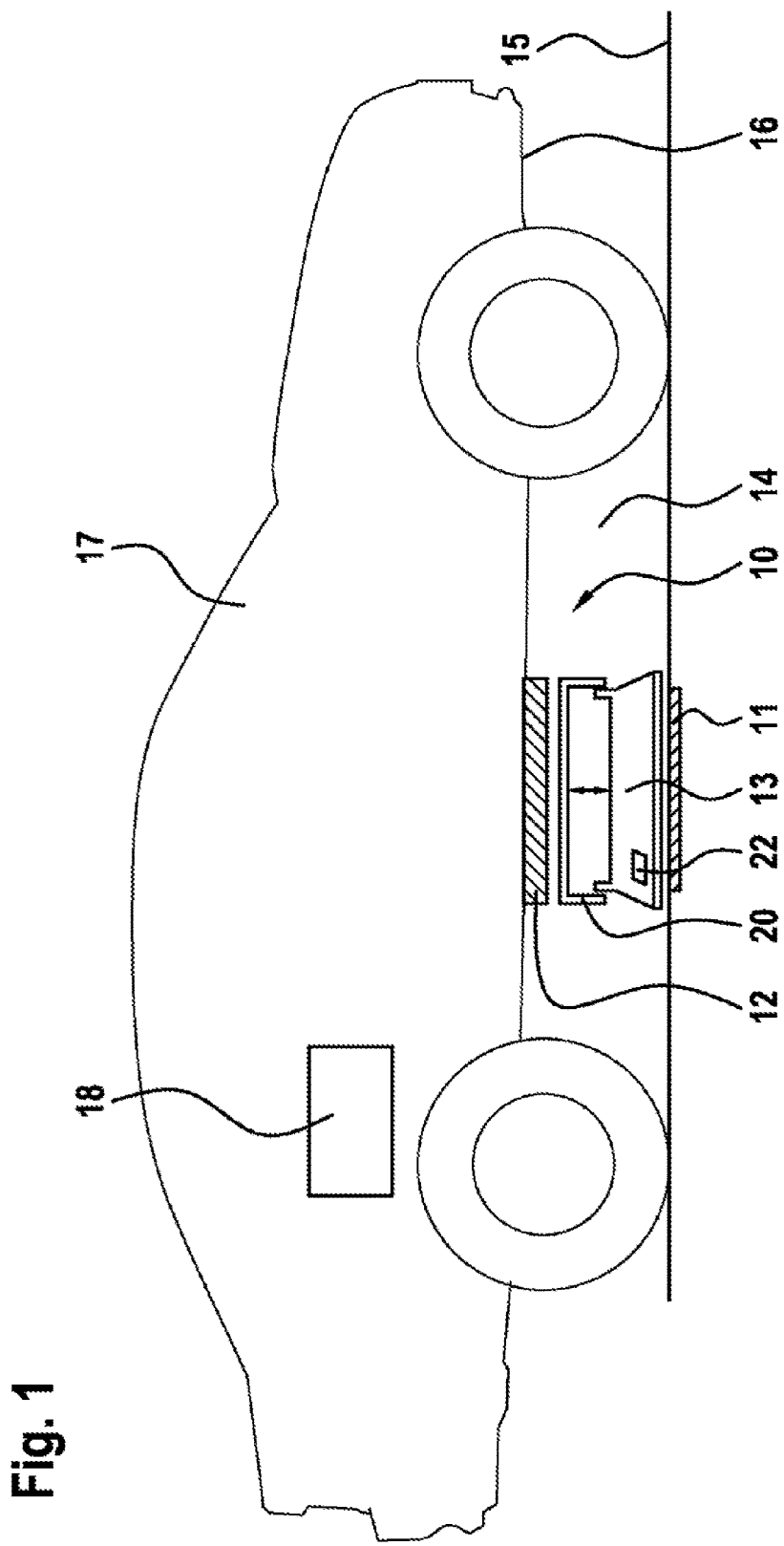
FIG. 1 shows a schematic depiction of a vehicle and a device for inductive energy transfer, including a field concentrator.

FIG. 1 shows a vehicle 17 which is parked over a device for inductive energy transfer 10 (inductive charging station). The vehicle 17 is parked in such a way in this case that the receiver coil 12 of the vehicle 17 is disposed as far as possible above the emitter coil 11. Due to the required ground clearance of the vehicle 17, there is an intermediate space 14 having an air gap between the ground 15, in which the emitter coil 11 is disposed or on which the emitter coil 11 is placed, e.g., as a charging pad, and the vehicle underbody 16 of the vehicle 17, in which the receiver coil 12 is located. This intermediate space 14 having the air gap can be multiple centimeters in size. Air gaps between 10 cm and 25 cm are expected in vehicle types which are commonplace nowadays. Other sizes for the intermediate space between the ground 15 and the vehicle underside are also possible, however. This intermediate space 14 is normally freely accessible in this case. If the vehicle 17 is not parked precisely over the emitter coil 11 and, therefore, there is an offset between the emitter coil 11 and the receiver coil 12, a poor magnetic coupling factor results. Said coupling is relatively small between the two coils 11 and 12. As a result, there is a high portion of reactive power in the power electronics of the transfer, which must be overcome. A field concentrator 13 is utilized for this purpose, in order to be able to better concentrate the magnetic field between the emitter coil 11 and the receiver coil 12 onto the receiver coil 12. The field concentrator 13 is designed as a mobile pedestal or a mobile robot (comparable to known robotic vacuums) and is an adapter between the emitter coil 11 and the vehicle coil 12, in order to bridge the air gap or the intermediate space 14 and compensate for the position of the vehicle 17 in the event of an offset. The field concentrator 13 consists of a magnetically highly conductive material which bundles the magnetic field between the emitter coil 11 and the receiver coil 12 onto the receiver coil 12. In order to compensate for the parking offset, the magnetic field is moved laterally in such a way that the magnetic field achieves high coupling even in the event of a high offset. The field concentrator 12 is optionally designed to be larger than the ground plate or the charging pad 19 or the emitter coil 11. In addition, the field concentrator is provided with a lifting unit 20 which makes it possible to adapt to different coil gaps. In addition, the field concentrator 13 is equipped with a sensor 22 or sensors 22, via which the vehicle position of the vehicle 17 is detected, in order to compensate for the offset between the emitter coil (or ground coil) 11 and the receiver coil (or vehicle coil) 12 in the best possible way, and therefore the field concentrator 13 searches for the optimal position under the vehicle 17 and therefore keeps the variance of the coupling factor as low as possible. Due to the air gap or the intermediate space 14 under the vehicle 17 being filled by the field concentrator 13, the danger of foreign objects entering the magnetic field during the charging process is minimized. In addition, the complexity required to achieve a position-tolerant design in the transmission coils and the power electronics is reduced in the inductive charging system 10. As a result of the improved coupling factor, the intensity of the stray field outside the transmission volume is also reduced.

After the vehicle 17 has been parked in such a way that the receiver coil 12 in the vehicle 17 is located over the emitter coil 11, the charging of the traction battery 18 can begin. The emitter coil 11 generates a magnetic alternating field for this purpose. The magnetic alternating field is received by the receiver coil 12 and is converted into electrical energy. This electrical energy is then available for charging the traction battery 18. In order to reclaim electrical energy from the vehicle 17 into a power supply network, the coil in the vehicle 17 can function, conversely, as an emitter coil which generates a magnetic field. The coil in the charging station then operates as a receiver coil which receives the energy of the magnetic field and converts said energy into electrical energy. This electrical energy can then be fed into a power supply network.

Figure 2:
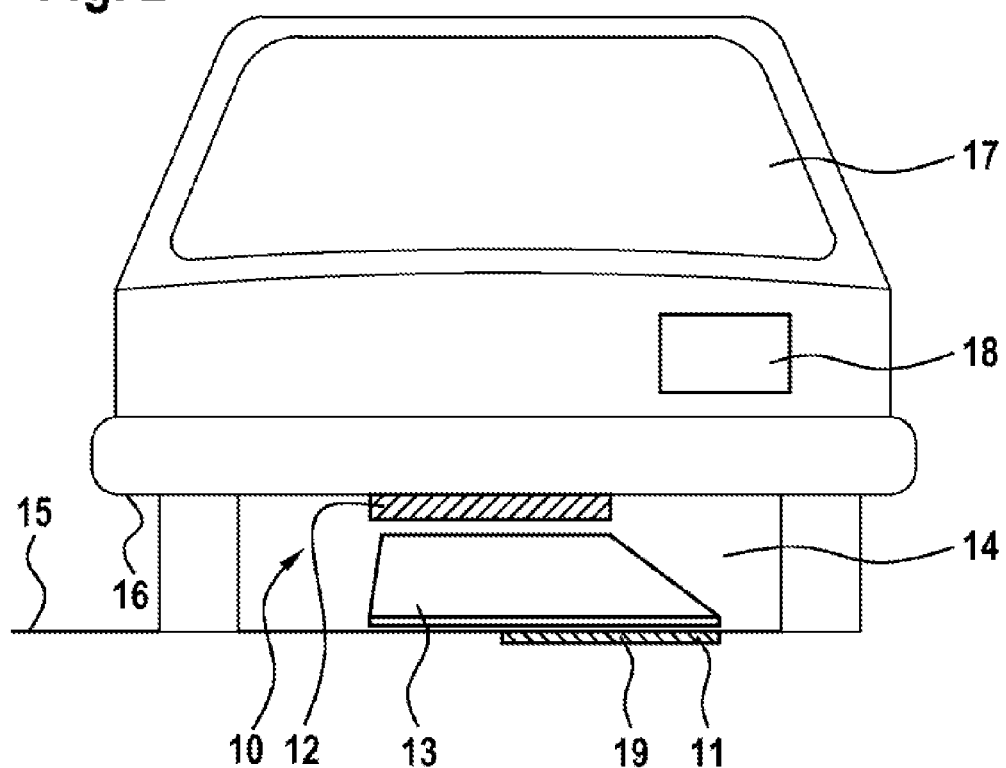
FIG. 2 shows a further schematic depiction of a vehicle and a device for inductive energy transfer, including an asymmetrical field concentrator.

FIG. 2 shows a schematic depiction of one alternative embodiment of the device 10 for inductive energy transfer. Identical elements shown in FIG. 1 are provided with the same reference numbers and are not explained in greater detail. In this FIG. 2, the field concentrator 13 is designed to be asymmetrical and can compensate for the parking offset by means of a suitable rotation and lateral movement.

Figure 3:
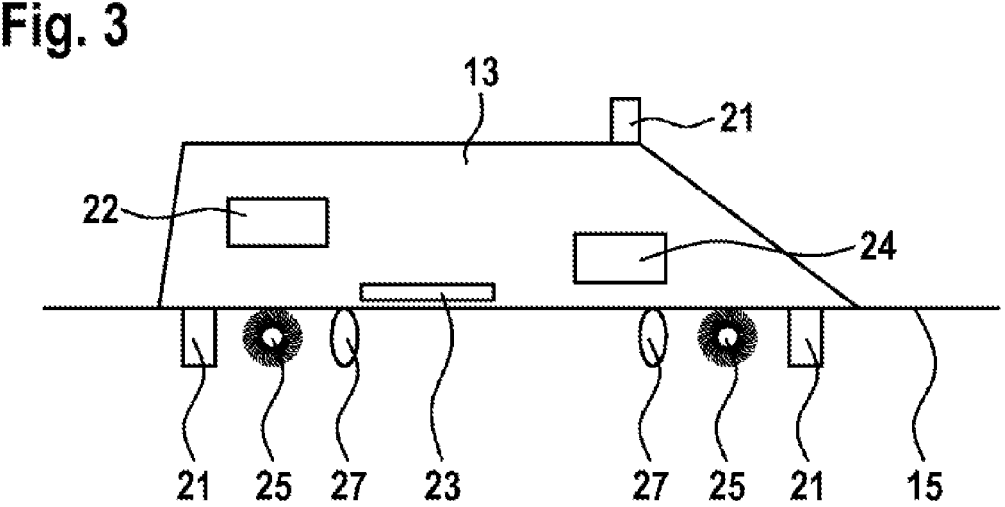
FIG. 3 shows a schematic depiction of a field concentrator.

FIG. 3 shows a schematic depiction of the field concentrator 13. Identical elements shown in FIG. 1 and in FIG. 2 are provided with the same reference numbers and are not explained in greater detail. In order to ensure that no unwanted objects (objects such as, e.g., metals, foils, etc., or living beings such as, e.g., animals etc.) are located in the intermediate space 14 during the inductive energy transfer from the emitter coil 11 to the receiver coil 12, the field concentrator 13 is equipped with cleaning devices 25 such as, e.g., brushes or an air blade. Said field concentrator also comprises devices for sealing 21 the air gap or intermediate space 14. In addition, the field concentrator 13 has a propagation mechanism 27 for the purpose of autonomous positioning. These can be wheels, axles, rollers, etc. The field concentrator has a sensor 22 or sensors 22, by means of which the field concentrator finds the optimal position. These sensors can orient themselves either with respect to the vehicle 17 or the receiver coil 12 of the vehicle 17. It is possible to use optical sensors, inductive sensors, ultra broadband sensors, radar sensors, RFID sensors, ultrasonic sensors, or capacitive sensors. Alternatively, the sensor 22 can be installed internally and can use the transmission magnetic field between the emitter coil 11 and the receiver coil 12 for self-orientation. One further possibility is to control the position of the field concentrator 13 by means of the regulation of the emitter coil 11 and the receiver coil 12 in such a way that the transmitted power is maximized. The field concentrator can also have a separate charging coil 23, in order to draw energy from the magnetic field, which forms during the charging process, in order to charge its own battery 24 or field concentrator battery 24.

The field concentrator 13 can be used for multiple charging stations having multiple devices for inductive energy transfer 10. The charging stations are advantageously disposed in a row and are all served by one or a few field concentrators 13 at staggered times.

What is claimed is:

1. A device for inductive energy transfer (10) for a vehicle (17) from at least one emitter coil (11) spaced from the vehicle to at least one receiver coil (12) on the vehicle (17), the at least one receiver coil being spaced apart from the at least one emitter coil (11), characterized in that a field concentrator (13) is disposed between the at least one emitter coil (11) and the at least one receiver coil (12), wherein the field concentrator is mobile and is equipped with at least one sensor that detects a position of the vehicle, and the field concentrator comprises a device for sealing an air gap between the vehicle and the emitter coil.

2. The device as claimed in claim 1, characterized in that the at least one sensor (22) is an optical sensor, an inductive sensor, a radar sensor, an ultrasonic sensor, or a sensor which operates by capacitance.

3. The device as claimed in claim 1, characterized in that the field concentrator (13) is positioned between the at least one emitter coil (11) and the at least one receiver coil (12) in such a way that a variance of a coupling factor between the at least one emitter coil (11) and the at least one receiver coil (12) is as low as possible.

4. The device as claimed in claim 1, characterized in that the field concentrator (13) is equipped with a lifting unit (20).

5. The device as claimed in claim 1, characterized in that the field concentrator (13) is asymmetrical.

6. The device as claimed in claim 1, characterized in that the field concentrator (13) comprises at least one charging coil (23) for charging the at least one field concentrator battery (24).

7. The device as claimed in claim 1, wherein the device for sealing (21) includes a flexible lip.

8. The device as claimed in claim 1, characterized in that the field concentrator (13) comprises a cleaning device (25) including brushes.

9. The device as claimed in claim 1, characterized in that the field concentrator (13) comprises a cleaning device (25) including an air blade.

* * * * *